United States Patent [19]

Makino

[11] 4,168,252
[45] Sep. 18, 1979

[54] PROCESS FOR MANUFACTURING ORGANOSILICON SYNTHETIC RESIN FROM ALKALI PULP BLACK LIQUOR

[76] Inventor: Toshiaki Makino, No. 182, Imai-cho, Hodogaya-ku, Yokohama, Kanagawa-ken, Japan

[21] Appl. No.: 843,591

[22] Filed: Oct. 19, 1977

Related U.S. Application Data

[63] Continuation-in-part of Ser. No. 551,717, Feb. 21, 1975, abandoned, which is a continuation of Ser. No. 393,830, Sep. 4, 1973, abandoned.

[30] Foreign Application Priority Data

Sep. 4, 1972 [JP] Japan .................................. 47-87955

[51] Int. Cl.$^2$ .............................................. C08L 97/00
[52] U.S. Cl. ...................................... 260/17.5; 106/74; 260/9; 260/124 R
[58] Field of Search ...................... 260/17.5, 124 R, 9; 106/74

[56] References Cited

U.S. PATENT DOCUMENTS

| | | | |
|---|---|---|---|
| 2,849,314 | 8/1958 | Goss | 260/17.5 |
| 3,677,884 | 7/1972 | Bornstein | 161/262 |
| 3,865,616 | 2/1975 | Akerblom | 260/17.5 |
| 3,940,352 | 2/1976 | Wennerblom | 260/17.5 |

OTHER PUBLICATIONS

Chem. Absts., vol. 65:17195c.

*Primary Examiner*—Edward M. Woodberry
*Attorney, Agent, or Firm*—Toren, McGeady and Stanger

[57] ABSTRACT

A method for producing organosilicon oils and resins from alkali pulp black liquors wherein the black liquor is first mixed with a substance having an acidity stronger than silicic acid and then the mixture is heated and concentrated precipitate convert any silicate therein to silicic acid but in a manner to avoid the precipitation of any alkali lignin salts. If the black liquor does not originally contain sufficient amounts of silicates. silicates from an external source may be added. This mixture is then reacted by heating to produce organosilicon resins. The resins and oils thus produced are useful as insulators and heat resistant materials.

3 Claims, No Drawings

PROCESS FOR MANUFACTURING ORGANOSILICON SYNTHETIC RESIN FROM ALKALI PULP BLACK LIQUOR

CROSS-REFERENCE TO RELATED APPLICATIONS

This application is a continuation-in-part of still pending Ser. No. 551,717, filed Feb. 21, 1975, now abandoned which in turn was a continuation of application Ser. No. 393,830, filed Sept. 4, 1973, now abandoned.

BACKGROUND OF THE INVENTION

1. Field of the Invention

This invention relates to the field of treatment of alkali pulp black liquors to obtain useful organosilicon resins and oils therefrom.

2. Background of the Invention

Alkali pulp black liquors such as those obtained from paper processing and which include sulfite pulp black liquors generally present problems with respect to their disposal. Thus, these materials are highly corrosive and generally do not contain any useful compounds or are difficult to treat in order to retrieve the useful compounds therefrom. Moreover, because of the corrosiveness, such materials can not simply be disposed of into waterways because of the extreme pollution problems which they cause.

Such alkali pulp black liquors generally contain various types of sugar acids, sugar alcohols, and other compounds containing hydroxyl radicals e.g., other types of carbohydrates or polyfunctional organic systems. Certain types of black liquors, particularly those obtained from the pulp digestion utilizing an alkali process treatment of plants of the gramineae family, e.g., rice straw, also contain silicic acid and other water soluble or insoluble silicates. In contrast, the black liquor obtained from wood usually treated with the sulfate process does not contain silicic acid.

In any event, all of these black liquors are generally disposed of without attempting to obtain any useful products therefrom because of the complexity of the mixtures of which such black liquors are composed.

SUMMARY OF THE INVENTION

Applicant has discovered a method for the treatment of alkali pulp black liquors wherein the liquor is first treated with an acid to adjust the pH to between 8 to 10 and the thus pH adjusted material is concentrated and heated to convert any silicates therein to silicic acid and to precipitate any silicic acid therein. However, this is carried out so as to avoid the precipitation of alkali lignin salts.

If silicates or silicic acid are not inherently present in the black liquor, the silicates from an external source can be added.

Alternately, an organosilicon compound having the formula $R_xSi\ X_{4-x}$ wherein R is a univalent organic group, x is 0, 1, 2 or 3 and X is a hydroxyl, alkoxyl or halogen atoms can be added from an external source. The entire mixture is then reacted by heating to produce organosilicon resins and oils which can be separated from the ultimate mixture in conventional manner.

The nature of the oil or resin finally obtained depends on the particular type of black liquor utilized. However, the organosilicon compounds obtained with the present invention can generally be classified as follows:

1. Silicon oil which is suitable for lubricating uses wherein large temperature changes occur;
2. Silicon grease can be used as an axle grease and is particularly suitable for use at high temperatures since it is more heat and oxidation resistant as compared to petroleum greases;
3. Silicon resin which possesses excellent heat resistance at high temperatures and can be used as an insulating material;
4. Silicon powder which essentially is a solid resin which can be powdered and utilized as a polishing material for glass and the like. All of these compounds can be obtained with the present invention.

DESCRIPTION OF THE PREFERRED EMBODIMENTS

In the process of this invention, silicon containing compounds having, in a molecule, one or more silanolic hydroxyl groups are formed in an alkali pulp black liquor, which is produced in pulp digestion following the soda, sulfate, or lime processes or is prepared from a sulfite pulp liquor by an alkali treatment.

More particularly, silicic acid is formed by decomposing water soluble or insoluble silicates, with acids stronger than silicic acid and metal or ammonium salts thereof. The process of this invention is successfully carried out by the combined use of gelatinous silicon dioxide and ammonia water, but does not succeed with gelatinous silicon dioxide alone, implying formation of ammonium silicate on heating which is followed by decomposition into silicic acid. Silicates can be decomposed also with sulfur.

In either method mentioned, the reaction mixture is maintained in an alkaline condition so as to avoid causing precipitation of an alkali salt of lignin. This process comprises adding a suitable amount of ammonia water to the acid solution, heating the reaction mixture which contains an aqueous solution in the sufficient amount enough to produce silanolic hydroxyl groups by hydrolysis at pH 8–10 and completing the condensation polymerization reaction by removing unreacted substances by vaporization.

It is noted that in this process organic compounds may be used in place of alkali pulp liquor, which have hydroxyl groups or are capable of producing hydroxyl groups by hydrolysis with water, acid or base. In these cases condensation polymerization is carried out both in an acid or alkaline condition.

Polyfunctional silicic acid which has been produced from a silicate by the action of hydrochloric acid or aluminum sulfate reacts with a polyfunctional organic compound having hydroxyl groups to give a three dimensional cross-linked polymer as a result of intermolecular reaction. On the contrary, a linear or chain polymers is produced when the condensation polymerization is carried out under the condition which favors the intramolecular reaction by adding one or more of hydrogen bonding solvents and while removing water and other unreacted substances by evaporation.

In case a silicate is used, an acidic solvent should be selected for decomposition. As a hydrogen bonding solvent, one or more of those acidic solvents are used which contain unsaturated bonds and groups having active hydrogen atom such as NH, SH and OH. Among them, acid amides are the most suitable solvents. It is easily understood that the strength of the hydrogen bond of acidic solvent used, nature of the metal involved and other factors influence the property of polymers to be produced.

Phosphoric acid, ammonium phosphate and aromatic carboxylic acids, when used as acidic solvent, make the alkali metals present inactive and work to prevent depolymerization due to humidity after the polymerization.

The polymerized product which has been prepared using phosphoric acid, nitric acid or an acid amide as solvent is not hardened when left at the room temperature, but becomes hard at room temperature when ammonium phosphate, ammonium nitrate or aromatic carboxylic acids are used as solvent.

As has been explained, the present invention relates to a process for manufacturing a novel organosilicon synthetic resin having heat resistant and insulating properties in the liquid, grease and solid states which can be manufactured in the alkaline or acid state by the condensation polymerization of a reaction mixture.

Generally speaking, there exist numerous kinds of silicon synthetic resins in view of differences in substituents, branching coefficient, degree of polymerization, kind of remaining functional groups and the metal contained, as well as other factors.

It has been known an alkali pulp black liquor contains sugars, such as, pentose, succharic acids that have been produced by oxidation or reduction of sugars, sugar alcohols, furfurals, phenols, alcohols, resin acids, carboxylic acids and many others.

In the actual embodiment of this invention, an alkali pulp black liquor is condensed to about 7° to 10° Baumé and silicates, e.g., water soluble silicates, such as, alkali metal silicates and water insoluble silicates, such as, silicates of alkaline earths, aluminum and zinc are added. An acid solution is added to the black liquor in the concentration and amount suitable in accordance with the degree in Baumé of the latter so that alkali lignin salts do not precipitate. The concentration and quantity of the acidic solution depend on concentration, temperature, silicates content and pH of the black liquor, so that silicic acid is obtained after decomposing silicates without precipitation of the alkali lignin salts. Strongly acidic substances that decompose silicates to form silicic acid include: inorganic acids, such as, hydrochloric, sulfuric and nitric acids, hydrogen peroxide, organic acids such as glacial acetic, benzoic and tartaric acids, phenols, metal salts such as calcium chloride, aluminium sulfate, zinc chloride, and lead acetate, ammonium salts such as chloride, sulfate and nitrate, ammonacetic acids, such as, guanidine, urea, sulfamic acid and acetamidine, aquoammonacetic acid such as acetamide, sulfanilic amide and acetanilide.

Hydrochloric acid is taken as an example of acid solutions for explanation. A black liquor obtained by digestion of rice straws with 13% by weight of sodium hydroxide is condensed to 10° Baumé, of which 200 cc is used. 10 cc of 35% hydrochloric acid is diluted with 10 cc of water, of which 10 cc is added to the condensed black liquor obtained above when silicic acid is precipitated at 30° C. In this case, alkali lignin salt does not react to precipitate, but the solution remains black and the pH is lowered from 11 down to 9.

Rice straw contains as much as 10 to 12% of silicic acid, and therefore the silicic acid reacts with sodium hydroxide to form sodium silicate in the black liquor.

As an acid solution, inorganic and organic acids and various metal salts may be used alone, but the combined use of ammonia water makes the precipitation of alkali lignin sales difficult, and the ammonia makes the reaction proceed smoothly.

An excess of ammonia water makes the polymerization reaction incomplete, so the solution is desirably kept slightly acid by mixing an acid solution with the ammonia water.

On the other hand, when water insoluble silicates such as silicates of alkaline earth metals, aluminum and zinc are used, sole use of an inorganic or organic acid or a metal salt can not decompose the silicate to form silicic acid without precipitating alkali lignin salt, on account of the low alkalinity of the black liquor due to the water insolubility of the silicate. In the combined use of ammonia water with the acidic substance, the silicate is decomposed smoothly and the condensation polymerization proceeds completely in the process of heating and dehydration.

Silicon dioxide commercially obtained in the form of fine powder or gelatine can not successfully polymerize the black liquor when the silicon dioxide diluted with water is added to the liquor and heated and dehydrated to react. However, if silicon dioxide and the black liquor is heated to a high temperature in an autoclave to form the silicate, the condensation polymerization can be accomplished. Further, the condensation polymerization is also carried out successfully with the combined use of gelatinous silicon dioxide and ammonia water. It is presumed in the process of heating and dehydration that ammonium silicate is first formed and then it is decomposed into silicic acid.

The condensation polymerization is also possible with fine sulfur powder combined with silicate. Gelatinous sulfur, which has been prepared from powdery sulfur diluted with aqueous solution and heated and dehydrated, is desirably diluted with aqueous solution and added in a mixture with silicate to the black liquor. An excess of sulfur over the chemically equivalent amount, if any, may burn when the mixture is heated to harden into a solid resinous matter and care must be taken in this regard.

An alkali pulp black liquor is generally produced by the hydrolysis of carbohydrate, such as, hemicellulose and lignin. Hemicellulose produces pentose and hexose and sugar acids and alcohols each containing 4 to 5 hydroxyl groups by oxidation and reduction, respectively. On the other hand, the chemical structure of lignin is not completely known, but is presumed to contain three alcoholic hydroxyl groups and three phenolic.

In the present invention, useful organosilicon compounds are produced by reacting the following:

(A) $Si(OH)_4$ (A) is orthosilicic acid, which is produced from silicates and inorganic silicon halogenides by decomposing or hydrolyzing in an alkali pulp black liquor with an acid solution.

(B) $MaR(OH)n$, Ma is alkali metal or alkaline earth metal and R is a MoNo or polyhydroxyl organic group.

(B) is a black liquor which is a mixture of polyfunctional organic compounds, produced by the alkali digestion.

A three-dimensional polymer will be formed when the polyfunctional compounds that are covered by above (A) and (B) are cross-linked by intermolecular condensation. For example, a silicate is decomposed with hydrochloric acid, aluminum sulfate or hydrogen peroxide to form silicic acid, and then heated and dehydrated to give rise to condensation polymerization, to obtain solid resinous matter having a three-dimensional structure.

However, the intermolecular reactions can be preferentially made to occur by changing the circumstance of the system, for example by adding a particular acidic solvent. This can be realized in case of silicic acid and hydroxyl organic compounds where the OH groups exhibit strong tendency for hydrogen bonding with the aqueous solution, by adding a more strongly hydrogen bonding solvent to form hydrogen bond with directly silicic acid or hydroxyl organic compounds to accelerate the intermolecular reaction. Thus, if it is possible for the compounds reacting from (A) and (B) to behave as if they are difunctional and unifunctional, a linear or chain polymer can be obtained by removing water by boiling and unreacted substances by vaporization.

After reacting an alkali metal silicate with an excess of acetamide to form $Si(OH)_4$, the reaction mixture obtained is heated. Although details of the reaction is unknown yet, following reactions are presumed to occur.

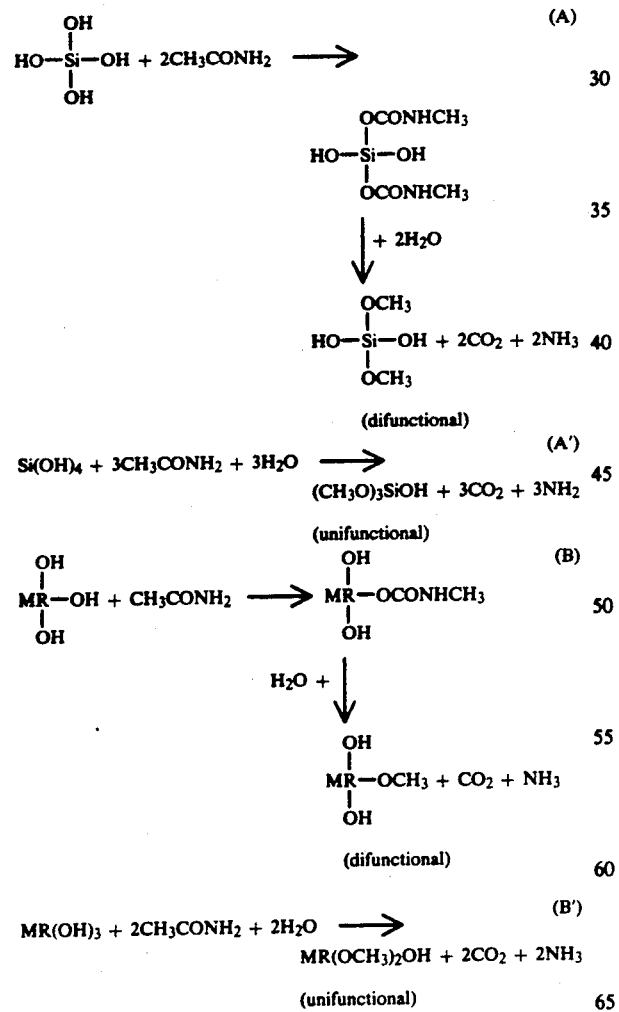

it is anticipated from reaction (A) (A') through (B) (B') that A(difunctional)+B(difunctional)

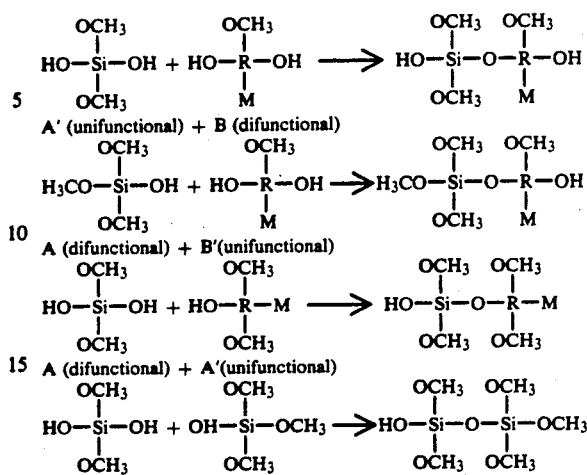

It is anticipated from reactions that condensation polymerization products containing siloxane bonds of various physical states that range from oily, rubbery to greasy depending on the amounts of solvent added.

In fact, various polymers of different properties can be obtained by varying the amount of acetamide to be added for the silicate to decompose into silicic acid. A large amount of addition produces an oily product, and lesser amounts of a viscous matter. When even less is added, one half of the starting material turns into a viscous matter and the other half is hardened into a solid resinous matter.

Suitable hydrogen bonding solvents that favor the intermolecular reaction include those compounds which contain unsaturation and active hydrogen groups, such as, NH, SH and OH. Various polymers can be produced depending on the capacities of the solvent for forming hydrogen bonds. Products from the condensation polymerization treated by heating and dehydration are hot or, immediately or after standing 2 to 5 days at room temperature hardened, depending on the kind of solvent used.

The hardening is believed to occur by oxidation or hydrogenation, leading to stabilization. Some of the product polymers can be prevented from depolymerization by polymerizing in an alkaline state followed by inactivation of the alkali metal present.

The following classification shows the effects of acidic solvents on the condensation polymerization when the solvent is added to an alkali pulp black liquor and the mixture is heated and dehydrated.

Solvent: Inorganic compounds (1) Materials that decompose silicates to form orthosilicic acid $Si(OH)_4$ and three dimensionally crosslinked polymers therefrom (solid resinous):

Hydrochloric acid, sulfuric acid, hydrogen peroxide water, aluminum sulfate, ammonium chloride (The last one has an intermediate property between (1) and (2)).

(2) Hydrogen bonding solvents that form linear and drain polymers (the products are oily, rubbery and greasy).

Inorganic acids:

Phosphoric acid: Greasy product is formed which after condensation polymerization prevents depolymerization by inactivating the alkali metal.

Nitric acid: Forms greasy products.

Ammonium salts:

Ammonium phosphate (HN$_4$)$_2$HPO$_4$: Readily hardened when left at room temperature. Inactivates alkali metals.

Ammonium nitrate NH$_4$NO$_3$: Hardened when left at room temperature.

Ammonium carbonate (NH$_4$)$_2$CO$_3$

Ammonium sulfate (NH$_4$)$_2$SO$_4$

Ammonium sulfaminate NH$_4$SO$_3$NH$_2$

Hardened when left at room temperature.

The second one has an intermediate property between (1) and (2).

Halogenated unsaturated hydrocarbons:

Dichloroethane CH$_3$ClCH$_2$Cl

Tetrachloroethane Cl$_2$CHCHCl

Hardened when left at room temperature.

Mixed solvent of ammonia water and inorganic acid: Adjusted so as to maintain weak acidity.

Solvent: organic compounds

Acid amides and ammonoacids:

Formamide HCONH$_2$; acetamide CH$_2$CONH$_2$; urea NH$_2$CONH$_2$;

guanidine NH$_2$CNHNH$_2$; acetamidine CH$_3$CNHNH$_2$;

acetanilide C$_6$H$_5$NHCOCH$_3$.

Mixed solvents composed of aliphatic carboxylic acid, aldehyde, or ketone, all having C=O group, with ammonia water are excellent solvents.

Aliphatic carboxylic acids:

Formic acid; acetic acid

Aldehydes:

Formaldehyde; acetaldehyde.

Ketones:

Acetone; methylethyl ketone.

Ammonobases:

Aliphatic and aromatic primary, secondary and tertiary amines; monomethylamine; diphenylamine, trimethylamine;

Those compounds having NH or carboxyl groups readily form strong hydrogen bonds and work as an excellent solvent. They provide oily, rubbery or greasy products which are not hardened when left at room temperature.

Sole use of aliphatic carboxylic acids, aldehydes and ketones which have C=O groups provides greasy products which do not become hard. However, combined use of them with primary, secondary or tertiary amines gives a viscous polymer which is hardened in 3 to 5 days at room temperature.

Aromatic carboxylic acids:

Benzoic acid;

Excellent solvent. Readily hardened when left at room temperature and the alkali metal is inactivated.

Aromatic aldehydes, ketones:

Benzaldehyde; acetophenone.

Form aromatic carboxylic acids by hydrolysis with added hydrochloric acid. Produce greasy products which do not become hard.

Phenol:

Hardened when left at room temperature.

Nitriles:

Acetonitrile: Forms aliphatic carboxylic acid when hydrolyzed with hydrochloric acid added. Provides greasy products.

Sulfur containing compounds

Compounds having both SH and C=O groups:

Thioglycolic acid HSCH$_2$COOH: Excellent solvent. Provides greasy products.

Compounds having both S=O and NH groups:

Sulfanilic acid amide NH$_2$C$_6$H$_4$SO$_2$NH$_2$: Hardened when left at room temperature, as is generally the case with sulfur containing compounds.

A product with lower degree of polymerization and a lower viscosity is obtained with the decrease of the quantity of the alkali metal contained in the black liquor. The softer the product is, the higher the silicon content is. The polymer obtained by the reaction of calcium silicate with an acid amide in a black liquor which contains an alkaline earth metal but not an alkali metal, or in a black liquor produced by the lime process, is more oily than the product obtained from an alkali metal silicate and a black liquor containing an alkali metal by the polymerization reaction.

In the similar manner, the reaction of a water insoluble silicate, such as, silicates of calcium and zinc in place of silicate of sodium in a black liquor prepared by digesting with alkali metal provides a more oily product. However, a much more oily product can be obtained by polymerizing the mixture in an autoclave which has been prepared by adding silicon dioxide instead of sodium silicate to a black liquor at pH 9 obtained by digesting with alkali metal in order to prepare sodium silicate.

High molecular weight organopolysiloxanes prepared by polymerization using an alkali metal compound are relatively unstable when exposed to a humid atmosphere or a high temperature. This lack of stability is caused by the action of a catalyst or the influence of an alkali metal compound to convert the high molecular weight substance into a low molecular weight state by hydrolysis. In order to avoid the instability against humidity and high temperatures, it is required to remove or neutralize the alkali metal compound in the organopolysiloxane. Several methods known in the art can be used for neutralizing the catalyst after polymerization is completed.

The methods employ, for example, organic phosphorus compounds, iodine, a trace amount of silica, alpha-chlorohydrine, ammonium halides, quaternary ammonium halides, etc.

If a sulfite pulp black liquor is used, it is recommended that the black liquor is condensed to 20° to 40° Baumé, is made to pH 11 to 13 with sodium or potassium hydroxide or ammonia water and submitted to a heating treatment for 1 to 3 hours at 90° C. to 100° C. to convert the sugars into acids and alcohols and to decompose into low molecular weight substances the lignin sulfonic acid that has been condensed during the digestion process. Attention should be paid to the nature of the substances in the black liquor and the products of hydrolysis therefrom, because these substances and products differ tremendously depending on the nature of woods and grasses concerned. For instance, a black liquor resulting from pump digestion by the alkali process using rice straw as raw material does not require silicate to be added from outside becuase much silicic acid is contained in straw.

The following is an example of the various components of straws and bagasse wherein nearly 17-80% of the ash content is silicic acid.

| Kind | Ash | Lignin | Hemi-cellulose | Cross & Bevan Cellulose | Cellulose |
|---|---|---|---|---|---|
| Wheat Straw | 6–8% | 17–19% | 27–32% | 50–54% | 33–38% |
| Rice Straw | 14–20% | 12–14% | 23–25% | 46–49% | 28–36% |
| Bagasse | 2% | 19–21% | 30–32% | 59–62% | 40–43% |

In wheat straw and bagasse, the silicic acid content is low so that silicates are to be added from an outside source.

In place of an alkali black liquor, organic compounds containing one or more OH groups may be used. These compounds include alcohols, such as, ethanol, butanol, propanol, ethyleneglycol, glycerine, benzyl alcohol, phenol, polyvalent phenol, and polyoxyalkylene ethers containing hydroxyl groups and some higher polymers.

Further, the compounds include aliphatic and aromatic carboxylic acid such as, formic, acetic, tartaric, benzoic, and phthalic acids, aliphatic and aromatic aldehydes and ketones such as, formaldehyde, acetaldehyde, benzaldehyde and acetophenone, and aliphatic and aromatic halogenated hydrocarbons, such as, methyl chloride, dichloroethane, tetrachloroethane and monochlorobenzene.

Those glucose and various alpha-aminoacids are also included which are obtained by hydrolysis of starch, cellulose, succharose and protein with dilute acid, alkali and enzymes.

When the substances mentioned above are used for the polymerization, the process can be accomplished in both an alkaline and an acidic condition.

To begin with, polymerization in an alkaline condition is described. When the polymerization is carried out using a water soluble silicate, such as, an alkali metal silicate, a mixture of alcohol and a small amount of alkali metal are added in an aqueous solution. Then an alkali metal silicate and finally either an acid solution alone or a mixture of ammonia water to decompose the silicate and form silicic acid in the reaction mixture is added. Preferably, the reaction proceeds in the range of pH 8 to 11. Precaution is needed not to add a solution of alkali metal silicate directly to the alcohol, because the reaction may not be completed on account of flocculation of the silicate solution. However, if the silicate is insoluble in water, as is the case with silicates of calcium, zinc and aluminum, the silicate may be added directly to alcohol. In such a case, where the solution shows a low alkalinity due to the water insolubility of silicate, a slight excess of ammonia water should be added to the acid solution to bring the pH of 9 to 11, which is useful to decompose the silicate to form silicic acid and to accelerate the polymerization to completion.

Regardless of the solubility of silicate in water, sulfur can be used to decompose the silicate to form silicic acid which is polymerized with methylalcohol in an alkaline condition to form a solid resinous matter.

Instead of silicates, the following can be used: organo-silicon compounds expressed by a general formula, $$R_xSiX_{4-x} (x=0 \text{ to } 3)$$

where R is univalent organo group, e.g., lower alkyl or other monovalent organic compound which does not interfere with the process, X is a hydroxyl group, halogen atoms, resulting from hydrolysis or not.

Also available are those compounds that satisfy the above formula and contain in the molecule silanolic hydroxyl groups or a group that is converted into silanolic hydroxyl group on hydrolysis.

For example,
(A) trichloromethylsilane $CH_3SiCl_3$
(B) dichlorodimethylsilane $(CH_3)_2SiCl_2$ If an aromatic aldehyde or ketone such as benzaldehyde and acetophenone is used for the purpose instead of an alkali black liquor, the compound is hydrolyzed with hydrochloric acid to form aromatic carboxylic acid. Thus, a mixture of benzaldehyde, hydrochloric acid and sodium silicate is mixed with the aqueous solution and the reaction is accelerated in the alkaline state with sodium hydroxide added to produce a greasy matter.

Similarly to the case of an alkali black liquor, various products, covering from oily, viscous, greasy to solid resinous, are formed depending on the difference of solvents to be added.

The products formed are washed with benzene, for example, or the alkali metal is neutralized to be inactive, so as to prevent depolymerization that may otherwise occur, as was done for the alkali black liquor.

When the polymerization is carried out in an acid condition, to the alcohol is first added an acid solution, and then a water soluble alkali metal silicate or water insoluble silicate of calcium, aluminum or zinc, and finally an appropriate amount of an acid solution to decompose the silicate to form silicic acid. If an aliphatic or aromatic carboxylic acid is used, an addition of the acid solution is not needed. However, it is recommended to add hydrochloric acid or sulfuric acid when an acid as weak as phenol is used.

When sulfur is used for decomposing a silicate to form silicic acid, addition of an acid solution is not required. The polymerization reaction carried out with methyl alcohol, alkali metal silicate, an aqueous solution and sulfur yields a resin which is not solidified. Of course, it is essential to add a sufficient amount of water to complete the hydrolysis.

On being heated for hydrolysis in glacial acetic acid, starch yields D-glucose, which, when heated and dehydrated for polymerization with sodium silicate and acetanilide, provides a viscous matter that is not solid but readily solidified if left at room temperature.

The polymerization product from aminoacetic acid, sodium silicate, glacial acetic acid and ammonia water was a powdery polymer. If the reaction is carried out in the presence of a solvent, various resins of different properties, such as, oily, viscous, greasy and resinous solid could be prepared, even in an acid condition depending on the solvent added, as mentioned above. The polymerization product thus prepared must be freed from any contaminating acidic substance by washing with an adequate solvent or neutralization.

The product polymer obtained from the reaction in an alkaline condition is naturally different from that in an acid condition.

Solid resinous polymers of better quality are prepared in an acid condition than in an alkaline condition. Alkali metals that are contained in the product should be removed by washing with a solvent or by neutralization because they may cause depolymerization of the product, but this treatment is more difficult for a product of solid resinous matter.

When water insoluble silicates, halogenated compounds, such as, silicon tetrachloride, alcohol, phenol and a volatile acid, such as, hydrochloric acid are used, the treatment of washing with a solvent of neutralization is unnecessary.

By the reaction of phenol with sodium silicate and hydrochloric acid in an acidic condition a powdery product is formed, of which condensation polymerization with sodium hydroxide in an alkaline condition produces an oily product that is readily solidified at room temperature. Benzoic acid yields a powdery product in the reaction with sodium silicate in an acid condition, but an adhesive powdery product in an alkaline condition obtained by adding sodium hydroxide.

D-glucose prepared by hydrolysis of starch by heating in glacial acetic acid is reacted with sodium silicate added in an acid condition to produce an adhesive powdery product, while in an alkaline condition containing sodium hydroxide, a greasy product is obtained.

The product in an acid condition from a mixture consisting of aminoacetic acid, sodium silicate and glacial acetic acid is powdery. If sodium hydroxide is added in an alkaline condition, a greasy matter is formed which is readily solidified upon standing at room temperature.

A mixture in an acid condition consisting of monochlorobenzene, sodium silicate and hydrochloric acid produces a powdery product.

A mixture of methyl alcohol, glacial acetic acid and sodium silicate produces a powdery matter both in an acid condition and in an alkaline condition with sodium hydroxide added.

As has been described before, commercially available silicon dioxide, either powdery or gelatinous, should be converted into a silicate before use. Gelatinous silica prepared by direct decomposition of a silicate followed by washing with water fails in the condensation polymerization reaction, but succeeds when a small amount of ammonia water is added. Presumably, ammonium silicate that is once formed in the course of heating and dehydration is decomposed into silicic acid.

In the process of the present invention, various conditions of heating, time of heating, amounts of materials used, can be used depending on the final type of product desired, which, in turn, depends on the nature of the initial waste liquor used. Since the starting product, i.e., the liquor is essentially a waste material, the composition of which is complex and variable, it is impossible to prescribe herein the exact conditions and parameters which might be necessary for a given starting material, and such conditions are not necessarily critical. What is important however, is that for a given starting material, sufficient reactants be added to convert the silicates to silicic acid and that the heating temperatures and times be sufficient to complete the polymerization. The specific amounts for a given starting material can be determined from small scale treatment.

Generally, however, typical parameters for carrying out the present process include first adjusting the pH of an alkali black liquor to the range from about 8 to 11, heating the thus treated black liquor at a temperature in the range from about 100° C. to 300° C. for about 1 hour to 3 hours to concentrate the liquor to the range from about 7° to 10° Baumé. Thereafter, if needed, a silicate may be added, and the mixture is further heated for a period from about 2 hours to 3 hours at a temperature in the range from about 100° C. to 300° C. to effect polymerization.

EXAMPLE 1

Production of a Silicon Resin

Rice Straw—300 g
Sodium hydroxide—39 g (13% against raw material)
Water—2400 cc
Time of digestion—3 hours (150° C.)

Assuming 14% of straw being ash of which 75% is silicic acid, the silicic acid in this example amounts to about 31.5 g, corresponding to about 10% of the total rice straw. The black liquor produced under the condition mentioned was condensed to 15° Baume, where the pH was 11.5. To 300 cc of this black liquor, 9 cc of a solution which was prepared by mixing glacial acetic acid with about twice as much volume of the aqueous solution was added under stirring at 30° C., to precipitate silicic acid, but not alkali lignin sale and the precipitated silicic acid was removed. The remaining black liquor was diluted with the aqueous solution to 10° Baumé, the pH being 9, to which 20 cc of an aqueous 20° Baumé solution of commercial sodium silicate was added from an external source under stirring. 60 g of ammonium chloride (NH$_4$Cl) dissolved in 100 cc of the aqueous solution was added and the resulting solution was agitated. The mixture solution was heated by direct fire to about 150° C. in an aluminum vessel under stirring, with bubbles being evolved, until a high viscosity is attained by condensation. Further heating was continued for 30 min. at 200° C., in which period the viscous liquid was gradually turned into a gelatinous matter, then partly into a solid matter, finally the gelatinous matter disappeared completely. Heating was continued for further 10 min., until the condensation polymerization was completed and the unreacted substances were volatilized in fume, leaving a dark brown solid resinous matter. Since the resulting matter is unstable against humidity and high temperatures due to the alkali metal therein, 50 cc of a 20° Baumé gelatinous liquid of antimony hydroxide or antimonic acid was mixed with 30 cc of acetone and the mixture was added to the product matter above under stirring. When the total mixture was heated for about 20 min. depolymerization due to free alkali metal could be prevented almost for its neutralization, giving an organic silicon resin of excellent heat resistance and insulation properties. In this condensation polymerization reaction, almost the total amount of the black liquor reacted, leaving little residue.

In the above treatment, antimonic acid was prepared by washing antimony pentachloride with water to remove hydrochloric acid, and antimony hydroxide was prepared by precipitating it from tartar emetic with dilute hydrochlorice acid followed by washing with water to remove hydrochloric acid.

Generally, in the following examples, unless otherwise specified, the procedure followed was to mix the components in the amounts indicated, and the mixture was heated to effect polymerization.

EXAMPLE 2

The Production of Silicon Resin

Black liquor 10° Baumé, pH 9, 300 cc
The same one as used in Example 1.
Sodium silicate 20° Baumé, 20 cc
Ammonia water NH$_4$OH 50 cc 28% concentration Aluminum sulfate $Al_2(SO_4)_3 \cdot 16H_2O$—30 cc 60 g of aluminum sulfate was dissolved in 200 cc of water and a 30 cc of said solution is prepared.

Aqueous solution—150 cc

Under stirring, sodium silicate was added to the black liquor, then ammonia water and finally 30 cc of a solution of aluminum sulfate so as not to precipitate any alkali lignin salt. The resulting product was heated and dehydrated, as in Example 1, to obtain a solid resinous matter.

EXAMPLE 3

The Production of Silicon Resin

Black liquor 10° Baumé,—pH 9—300 cc
Sodium silicate 20° Baumé,—20 cc
Hydrogen peroxide water 35% concentration—30 cc
Aqueous solution—100 cc The aqueous solution (100 cc) were added to the hydrogen peroxide water and in the mixture after stirring was added to the black liquor. The mixture obtained was heated and dehydrated as in Example 1 to obtain a solid resinous matter.

EXAMPLE 4

| The Production of Silicon Resin | |
|---|---|
| Black liquor 10° Baumé, pH 9 | 300 cc |
| Sodium silicate 20° Baumé | 20 cc |
| Hydrochloric acid 35% concentration | 15 cc |
| Aqueous solution | 100 cc |

100 cc of the aqueous solution was added to the hydrochloric acid solution and the resulting mixture was agitated, to which the black liquor was added.

In the same manner as in Example 1, the mixture obtained was heated to prepare a solid resinous matter.

EXAMPLE 5

| The Production of Silicon Resin | |
|---|---|
| Black liquor 10° Baumé, pH 9 | 300 cc |
| Sodium silicate 20° Baumé | 20 cc |
| Sulfur (fine powder) | 40 g |
| Aqueous solution | 150 cc |

The sulfur was heated in 100 cc of the aqueous solution and the mixture was condensed. Gelatinous sulfur thus formed was diluted with 150 cc of the aqueous solution, to which the black liquor and the sodium silicate were added. The mixture was treated in the same manner as in Example 1, to obtain a solid resinous matter.

EXAMPLE 6

| The Production of a Silicon Oil | |
|---|---|
| Black liquor 10° Baumé, pH 9 | 300 cc |
| Sodium silicate 20° Baumé | 20 cc |
| Formamide (HCONH$_2$) | 50 cc |
| Aqueous solution | 150 cc |

The procedure followed was the same as in Example 1. Unreacted substances as well as water were completely removed by heating. Fumes were evolved on further heating, and finally a highly viscous resin was formed instead of a solid resinous matter. In order to avoid depolymerization of the product, the alakli metal was almost neutralized with a 50 cc gel of 20° Baumé of antimony hydroxide or antimonic acid in 30 cc of acetone. The resulting mixture was heated for 20 min., then a viscous resin was produced.

EXAMPLE 7

| The Production of a Silicon Oil | |
|---|---|
| Black liquor 10° Baumé, pH 9 | 300 cc |
| Sodium silicate 20° Baumé | 20 cc |
| Ammonia water (28%) | 50 cc |
| Glacial acetic acid | 20 cc |
| Aqueous solution | 150 cc. |

Heating and dehydration carried out as in Example 6 turned the whole volume of the black liquor into a viscous resinous oil.

EXAMPLE 8

| The Production of a Silicon Oil | |
|---|---|
| Black liquor 10° Baumé, pH 9 | 300 cc |
| Sodium silicate 20° Baumé | 20 cc |
| Ammonia water (28%) | 40 cc |
| Formalin (HCHO) 37% concentration | 50 cc |
| Aqueous solution | 150 cc |

Heating and dehydration were done as in Example 6 and the whole volume of the black liquor turned into a viscous resinous oil.

EXAMPLE 9

| The Production of a Silicon Oil | |
|---|---|
| Black liquor 10° Baumé, pH 9 | 300 cc |
| Sodium silicate 20° Baumé | 20 cc |
| Ammonia water (28%) | 40 cc |
| Acetone | 60 cc |
| Aqueous solution | 150 cc |

Heating and dehydration carried out as in Example 6 made the whole volume of the black liquor turn into a viscous resinous matter.

EXAMPLE 10

| The Production of a Silicon Grease | |
|---|---|
| Black liquor 10° Baumé, pH 9 | 300 cc |
| Sodium silicate 20° Baumé | 30 cc |
| Glacial acetic acid | 50 cc |
| Aqueous solution | 150 cc |

Heating and dehydration were carried out as in Example 6 and the whole volume of the black liquor turned into a greasy resin.

EXAMPLE 11

| The Production of a Silicon Grease | |
|---|---|
| Black liquor 10° Baumé, pH 9 | 300 cc |
| Sodium silicate 20° Baumé | 30 cc |
| Phosphoric acid H$_3$PO$_4$ | 25 cc |
| Aqueous solution | 150 cc |

The whole volume of the black liquor turned into a greasy resin when the mixture was heated and dehydrated as in Example 6. The alkali metal was almost neutralized with added phosphoric acid without further addition of antimony hydroxide or antimonic acid, to prevent depolymerization from occurring.

EXAMPLE 12

| The Production of a Silicon Grease | |
|---|---|
| Black liquor 10° Baumé, pH 9 | 300 cc |
| Sodium silicate 20° Baumé | 30 cc |
| Nitric acid | 10 cc |
| Aqueous solution | 150 cc |

Heating following by dehydration as carried out in Example 6 turned the whole volume of the black liquor into a greasy resin.

EXAMPLE 13

| The Production of a Silicon Grease | |
|---|---|
| Black liquor 10° Baumé, pH 9 | 300 cc |
| Sodium silicate 20° Baumé | 30 cc |
| Acetonitrile $CH_3CN$ | 50 cc |
| Hydrochloric acid (35%) | 10 cc |
| Aqueous solution | 150 cc |

Heating and dehydration carried out as in Example 6 produced a greasy resinous matter from the total volume of the black liquor.

EXAMPLE 14

| Black liquor 10° Baumé, pH 9 | 300 cc |
|---|---|
| Sodium silicate 20° Baumé | 20 cc |
| Acetonitrile $CH_3CN$ | 50 cc |
| Hydrochloric acid (35%) | 15 cc |
| Aqueous solution | 150 cc |

A thorough mixture of 15 cc of hydrochloric acid with 150 cc of the aqueous solution was added to the black liquor, and the resulting mixture was heated and dehydrated as in Example 6, when one half of the materials turned into soft matter and the other half into a greasy matter without being solidified, in contrast to Example 13.

EXAMPLE 15

| The Production of a Silicon Resin | |
|---|---|
| Black liquor 10° Baumé, pH 9 | 300 cc |
| Sodium silicate 20° Baumé | 20 cc |
| Acetonitrile | 50 cc |
| Aqueous solution | 150 cc |

On heating as done in Example 6, the greater part of the mixture was solidified into a soft material.

EXAMPLE 16

| The Production of a Silicon Resin | |
|---|---|
| Black liquor 10° Baumé, pH 9 | 300 cc |
| Sodium silicate 20° Baumé | 20 cc |
| Dichloroethane $CH_2ClCH_2Cl$ | 50 cc |
| Aqueous solution | 150 cc |

On heating as in Example 6, the greater part of the mixture was solidified into a soft material.

EXAMPLE 17

| Black liquor 10° Baumé, pH 9 | 300 cc |
|---|---|
| Sodium silicate 20° Baumé | 20 cc |
| Dichloroethane | 50 cc |
| Ammonia water (28%) | 40 cc |
| Aqueous solution | 150 cc |

Heating followed by dehydration produced from one half of the material, a soft material and from the other half, a greasy material.

EXAMPLE 18

| The Production of a Silicon Resin | |
|---|---|
| Black liquor 10° Baumé, pH 9 | 300 cc |
| Sodium silicate 20° Baumé | 20 cc |
| Monomethylamine $CH_3NH_2$ | 50 cc |
| Glacial acetic acid | 40 cc |
| Aqueous solution | 150 cc |

Heating as in Example 6 turned the whole volume of the material into an oily product. This was solidified by standing at room temperature for 3 to 4 days. When the amount of glacial acetic added was reduced to 10 cc, one half of the material turned into a solid resinous matter and the other half into a viscous resin.

EXAMPLE 19

| The Production of a Silicon Resin | |
|---|---|
| Black liquor 10° Baumé, pH 9 | 300 cc |
| Sodium silicate 20° Baumé | 20 cc |
| Diphenylamine $(C_6H_5)_2NH$ | 60 g |
| Glacial acetic acid | 10 cc |
| Aqueous solution | 150 cc |

Heating as in Example 6 resulted in formation of a highly viscous pale brown resinous material. This was solidified in 3 to 4 days when left at room temperature.

EXAMPLE 20

| The Production of a Silicon Resin | |
|---|---|
| Black liquor 10° Baumé, pH 9 | 300 cc |
| Sodium silicate 20° Baumé | 30 cc |
| Formamide | 50 cc |
| Aqueous solution | 150 cc |

Heating carried out as in Example 6 turned the entire material into a viscous material. This product was likely to be depolymerized into a less viscous material by the action of alkali metal. When the polymerization reaction was carried out by heating with 25 cc of dimethyl phosphate, an organic phosphorus compound, and 50 cc of acetone, depolymerization due to alkali metal did not occur. The same result was obtained when the alkali metal was made inactive by adding 50 cc of a 20° Baumé gel of antimony hydroxide or antimonic acid in 50 cc of acetone. The product thus obtained was mixed with 50 g of ferric stearate, 50 g of benzoyl peroxide and 100 cc of acetone and the resulting mixture was heated and when substances, other than the polymer, were expelled in the form of fume. In due time, the heating was stopped and the polymer was taken out, which gradually solidified when kept at room temperature.

EXAMPLE 21

| The Production of a Silicon Resin | |
|---|---|
| Black liquor 10° Baumé, pH 9 | 300 cc |
| Sodium silicate 20° Baumé | 30 cc |
| Benzoic acid C$_6$H$_5$COOH | 50 g |
| Aqueous solution | 200 cc |

To the black liquor were added the aqueous solution containing the benzoic acid and then sodium silicate. The mixture was heated and dehydrated as in Example 6 to promote polymerization. The product obtained was an oily material which turned into a solid when left at room temperature. Depolymerization due to the presence of alkali metal was not observed when neither antimony hydroxide nor antimonic acid were present.

EXAMPLE 22

| The Production of a Silicon Resin | |
|---|---|
| Black liquor 10° Baumé, pH 9 | 300 cc |
| Sodium silicate 20° Baumé | 30 cc |
| Diammonium hydrogen phosphate (NH$_4$)$_2$HPO$_4$ | 50 g |
| Aqueous solution | 150 cc |

Heating and dehydration as in Example 6 for polymerization produced a viscous material, which when left at room temperature soon solidified. Depolymerization due to alkali metal was not observed, even when antimony hydroxide and antimonic acid were not used.

EXAMPLE 23

| The Production of a Silicon Grease | |
|---|---|
| Black liquor 10° Baumé, pH 9 | 300 cc |
| Sodium silicate 20° Baumé | 30 cc |
| Urea NH$_2$CONH$_2$ | 50 g |
| Aqueous solution | 150 cc |

Heating followed by dehydration as in Example 6 produced a greasy material as a product of polymerization.

EXAMPLE 24

| The Production of a Silicon Grease | |
|---|---|
| Black liquor 10° Baumé, pH 9 | 300 cc |
| Sodium silicate 20° Baumé | 30 cc |
| Benzaldehyde | 50 cc |
| Sulfuric acid | 10 cc |
| Aqueous solution | 150 cc |

Sulfuric acid in the aqueous solution was added to the black liquor. A greasy product was obtained when heating and dehydration were carried out as in Example 6.

EXAMPLE 25

| The Production of a Silicon Oil | |
|---|---|
| Black liquor 10° Baumé, pH 9 | 300 cc |
| Sodium silicate 20° Baumé | 30 cc |
| Thioglycolic acid HSCH$_2$COOH | 50 cc |
| Aqueous solution | 150 cc |

The polymerization reaction proceeded on heating and dehydrating as in Example 6 and a viscous matter was produced.

EXAMPLE 26

| The Production of a Silicon Resin | |
|---|---|
| Black liquor 10° Baumé, pH 9 | 300 cc |
| Sodium silicate 20° Baumé | 30 cc |
| Sulfanilic acid amide | 50 g |
| Aqueous solution | 150 cc |

A viscous product was obtained when heating and dehydration were carried out as in Example 6. The product, when left at room temperature, hardened somewhat.

EXAMPLE 27

| The Production of a Silicon Resin | |
|---|---|
| Black liquor 10° Baumé, pH 9 | 300 cc |
| Sodium silicate 20° Baumé | 30 cc |
| Monochlorobenzene C$_6$H$_5$Cl | 50 cc |
| Aqueous solution | 150 cc |

The polymerization reaction, proceeding as in Example 6 by heating and dehydrating, gave a viscous product which was solidified to a soft texture when kept at room temperature.

EXAMPLE 28

| | |
|---|---|
| Black liquor 10° Baumé, pH 9 | 300 cc |
| Silicon dioxide in gel 5° Baumé, pH 8 | 200 cc |
| Glacial acetic acid | 50 cc |
| Ammonia water (28%) | 20 cc |

The polymerization reaction was effected by heating and dehydrating as in Example 6 and one half of the starting material produced a solid and the other half gave a viscous material. It is assumed that ammonium silicate was formed on heating and dehydration, which then decomposed into silicic acid.

EXAMPLE 29

| The Production of a Silicon Resin | |
|---|---|
| Black liquor 10° Baumé, pH 9 | 300 cc |
| Calcium silicate in gel 25° Baumé | 100 cc |
| Ammonia water (28%) | 30 cc |
| Ammonium chloride NH$_4$Cl | 60 g |
| Aqueous solution | 200 cc |

Heating was performed as in Example 1. Almost the entire volume of the black liquor was hardened into a solid resinous material.

EXAMPLE 30

| The Production of a Silicon Oil | |
|---|---|
| Black liquor 10° Baumé, pH 9 | 300 cc |
| Calcium silicate in gel 25° Baumé | 100 cc |
| Formamide | 50 cc |
| Aqueous solution | 200 cc |

The polymerization reaction proceeded, as in Example 6, by heating followed by dehydration. The entire volume of the black liquor became viscous, somehat more oily than the product obtained when sodium silicate was used.

EXAMPLE 31

| The Production of a Silicon Oil | |
|---|---|
| Black liquor 10° Baumé, pH 9 | 300 cc |
| Zinc silicate in gel 10° Baumé | 100 cc |
| Aqueous solution | 200 cc |
| Formamide | 50 cc |

The procedure in Example 6 was followed and the product obtained was an oily resinous matter.

EXAMPLE 32

The Production of a Silicon Oil

A mixture consisting of 1,500 cc of a black liquor of 10° Baume and pH 9, 300 cc of a 25° Baumé gel of silicon dioxide and 1,000 cc of an aqueous solution was mixed thoroughly and heated in an autoclave at 150° C. for 3 hours, and then condensed into a 10° Baumé black liquor, which was used in the following process.

| Black liquor 10° Baumé | 300 cc |
|---|---|
| Formamide | 50 cc |
| Ammonia water (28%) | 10 cc |
| Aqueous solution | 150 cc |

Heating was performed as in Example 6. A very oily product was obtained from almost the entire volume of the black liquor.

EXAMPLE 33

| The Production of a Silicon Resin | |
|---|---|
| Straw (Rice) | 300 g |
| Slaked lime | 39 g |
| Water | 2400 cc |
| Digestion time: 10 hours at 150° C. | |

Slaked lime was prepared by the reaction of calcium chloride and sodium hydroxide and washing the product with water to almost completely remove the salts. Assuming the ash content of the straw is 14% and 75% of the ash is silicic acid, the straw contained about 31.5 g of silicic acid, amounting to about 10% of the total weight of straw. The black liquor thus formed was condensed to 20° Baumé, which contained calcium silicate because it was prepared by the lime process.

| Black liquor (containing calcium silicate) 20° Baumé | 300 cc |
|---|---|
| Ammonia water (28%) | 30 cc |
| Ammonium chloride NH₄Cl | 60 g |
| Aqueous solution | 200 cc |

First, ammonia water was added to the black liquor. Then ammonium chloride dissolved in the 200 cc of the aqueous solution was added to the black liquor. The resulting mixture was heated as in Example 1, when almost the entire volume was converted into a solid resinous matter. Since alkali metal was not involved, neutralization with antimony hydroxide or antimonic acid was not necessary.

EXAMPLE 34

| The Production of a Silicon Oil | |
|---|---|
| Black liquor 20° Baumé (containing calcium silicate) | 300 cc |
| Ammonia water (28%) | 30 cc |
| Formamide | 50 cc |
| Aqueous solution | 200 cc |

The black liquor was the same one as used in Example 33. A thorough mixture of formamide and the 200 cc of the aqueous solution was added to the black liquor to which ammonia water had been added. Heating was performed as in Example 6. A very oily product was voluminous as the whole volume of the black liquor was obtained.

EXAMPLE 35

| Black liquor 10° Baumé, pH 9 | 300 cc |
|---|---|
| Sodium silicate 20° Baumé | 40 cc |
| Ammonium chloride | 50 g |
| Aqueous solution | 150 cc |

Heating was performed as in Example 1, when one half of the total material was solidified and the other half turned into a greasy material. It was suspected that the small amount of ammonium chloride and the large amount of sodium silicate influenced the result in comparison with Example 1. Any hydrogen bonding solvent was believed to show an intermediate character as ammonium chloride and ammonium sulfate do.

The following examples illustrate the use of hydroxyl compounds to form the resins.

EXAMPLE 36

| The Production of a Silicon Resin | |
|---|---|
| Methyl alcohol CH₃OH | 300 cc |
| Sodium silicate 20° Baumé | 30 cc |
| Sodium hydroxide | 20 g |
| Ammonium nitrate | 60 g |
| Hydrochloric acid (35%) | 10 cc |
| Aqueous solution | 200 cc |

First a mixture of methyl alcohol and sodium hydroxide was heated to completely dissolve the latter, to which solution were added sodium silicate, ammonium nitrate dissolved in 200 cc of the aqueous solution, and hydrochloric acid. The resulting mixture was heated as in Example 1, and the entire volume of the mixture turned into a solid resinous matter. The polymerization reaction above proceeded in an alkaline condition.

EXAMPLE 37

| The Production of a Silicon Oil | |
|---|---|
| Methyl alcohol | 300 cc |
| Sodium hydroxide | 20 g |
| Sodium silicate 20° Baumé | 30 cc |
| Acetamide CH₃CONH₂ | 50 g |
| Glacial acetic acid | 20 g |
| Aqueous solution | 200 cc |

Sodium hydroxide is dissolved completely in methyl alcohol by heating, to which sodium silicate, acetamide dissolved in 200 cc of the aqueous solution and glacial acetic acid were added, in order for the reaction to proceed in an alkaline condition. An oily product was obtained.

EXAMPLE 38

The Production of a Silicon Grease

| Methyl alcohol | 300 cc |
| Zinc silicate in gel 25° Baumé | 150 cc |
| Ammonia water (28%) | 30 cc |
| Ammonium carbonate | 60 g |
| Aqueous solution | 200 cc |

When the heating was carried out as in Example 6, a greasy resinous matter that did not solidify was obtained. Depolymerization due to alkali metal was not observed because of absence of the alkali metal.

EXAMPLE 39

The Production of a Silicon Oil

| Methyl alcohol | 300 cc |
| Zinc silicate in gel 25° Baumé | 150 cc |
| Acetamide | 60 g |
| Ammonia water (28%) | 30 cc |
| Aqueous solution | 200 cc |

When heating was carried out as in Example 6, an oily resin was formed. No depolymerization due to alkali metal was observed.

EXAMPLE 40

The Production of a Silicon Resin

| Acetone (CH$_3$)$_2$CO | 400 cc |
| Sodium hydroxide | 20 g |
| Sodium silicate 20° Baumé | 40 cc |
| Hydrochloric acid (35%) | 15 cc |
| Aqueous solution | 200 cc |

Carbonyl compounds, such as, aldehydes and ketones do not contain hydroxyl group by themselves, but they behave as a hydroxyl compound in an aqueous solution. The above mixture was heated as in Example 1 and a solid resinous material was produced.

EXAMPLE 41

The Production of a Silicon Powder

| Benzoic acid | 100 g |
| Sodium silicate 20° Baumé | 50 cc |
| Sodium hydroxide | 20 g |
| Aqueous solution | 200 cc |

Heating was carried out as in Example 6 and an adhesive powdery matter was formed. The reaction proceeded in an alkaline condition.

EXAMPLE 42

The Production of a Silicon Grease

| Benzaldehyde | 300 cc |
| Sodium silicate 20° Baumé | 40 cc |
| Sodium hydroxide | 20 g |
| Sulfuric acid | 10 cc |
| Hydrochloric acid (35%) | 10 cc |
| Aqueous solution | 200 cc |

Heating was performed as in Example 6 and a greasy resinous material was produced. The reaction proceeded in an alkaline condition.

EXAMPLE 43

The Production of a Silicon Resin

| Phenol | 300 cc |
| Sodium silicate 20° Baumé | 40 cc |
| Aqueous solution | 200 cc |

Heating was performed as in Example 6 and a highly oily resin was produced which solidified when kept standing at room temperature.

EXAMPLE 44

The Production of a Silicon Grease

| Methyl alcohol | 400 cc |
| Silicon dioxide in gel 5° Baumé, pH 8 | 200 cc |
| Glacial acetic acid | 50 cc |
| Ammonia water (28%) | 80 cc |
| Aqueous solution | 200 cc |

Heating was performed as in Example 6 and a greasy material was produced instead of a solid. Supposedly, silicon dioxide reacted with ammonia in the course of heating to form ammonium silicate which then decomposed into silicic acid.

EXAMPLE 45

The Production of a Silicon Grease

A mixture consisting of 500 g of soluble starch, 100 cc of glacial acetic acid and 2,000 cc of the aqueous solution was heated for 2 hours in an autoclave at 150° C. A solution of D-glucose (dextrose) thus prepared was condensed to 7° Baume.

| D-glucose 7° Baumé | 400 cc |
| Sodium silicate 20° Baumé | 40 cc |
| Sodium hydroxide | 20 g |
| Aqueous solution | 200 cc |

Heating was performed as in Example 6 and a greasy material was produced. The reaction proceeded in an alkaline condition.

EXAMPLE 46

The Production of a Silicon Resin

| Aminoacetic acid | 200 g |
| Sodium silicate 20° Baumé | 40 cc |
| Glacial acetic acid | 50 cc |
| Sodium hydroxide | 20 g |
| Aqueous solution | 200 cc |

Heating was performed as in Example 6 and a greasy material was produced, which solidified when kept standing at room temperature. The reaction proceeded in an alkaline condition.

The examples referred to above involve the reaction in an alkaline condition. Reactions under acid conditions will be illustrated in the following example.

EXAMPLE 47

| The Production of a Silicon Resin | |
|---|---|
| Methyl alcohol | 300 cc |
| Sodium silicate 20° Baumé | 30 cc |
| Hydrochloric acid (35%) | 25 cc |
| Aqueous solution | 150 cc |

Sodium silicate was added to a thorough mixture of methyl alcohol, hydrochloric acid and 150 cc of the aqueous solution. The resulting mixture was heated as in Example 1, to obtain a solid resinous material. The reaction proceeded in an acid condition.

EXAMPLE 48

| The Production of a Silicon Powder | |
|---|---|
| Methyl alcohol | 400 cc |
| Sodium silicate 20° Baumé | 40 cc |
| Glacial acetic acid | 50 cc |
| Aqueous solution | 150 cc |

In a reaction carried out in an acid condition, where heating was performed as in Example 6 a powdery resinous material was produced.

EXAMPLE 49

| The Production of a Silicon Grease | |
|---|---|
| Methyl alcohol | 300 cc |
| Zinc silicate in gel 10° Baumé | 150 cc |
| Formalin (37%) | 50 cc |
| Aqueous solution | 150 cc |

The reaction proceeded in an acid condition. Heating as in Example 6 gave a soft resin that did not solidify.

EXAMPLE 50

| The Production of a Silicon Grease | |
|---|---|
| Methyl alcohol | 300 cc |
| Sodium silicate 20° Baumé | 30 cc |
| Sulfur (fine powder) | 30 g |
| Aqueous solution | 200 cc |

First, the sulfur is suspended in 100 cc of the aqueous solution and condensed by heating into a gelatinous matter. This was diluted in 200 cc of the aqueous solution, to which were added methyl alcohol and sodium silicate. Heating as in Example 6, gave a soft resinous material that did not solidify.

EXAMPLE 51

| The Production of a Silicon Oil | |
|---|---|
| Methyl alcohol | 300 cc |
| Sodium silicate 20° Baumé | 30 cc |
| Formamide | 50 cc |
| Glacial acetic acid | 40 cc |
| Aqueous solution | 150 cc |

Heating as in Example 6 gave an oily resinous material.

EXAMPLE 52

| The Production of a Silicon Grease | |
|---|---|
| Methyl alcohol | 300 cc |
| Zinc silicate in gel 25° Baumé | 150 cc |
| Formamide | 50 cc |
| Glacial acetic acid | 20 cc |
| Aqueous solution | 200 cc |

Heating as in Example 6 gave a greasy resin.

EXAMPLE 53

| The Production of a Silicon Resin | |
|---|---|
| Methyl alcohol | 300 cc |
| Silicon tetrachloride | 15 cc |
| Aqueous solution | 200 cc |

First silicon tetrachloride, then 200 cc of the aqueous solution were added to methyl alcohol. The resulting thorough mixture was heated as in Example 1, to give a solid resinous material.

EXAMPLE 54

| The Production of a Silicon Powder | |
|---|---|
| Benzoic acid | 100 g |
| Sodium silicate 20° Baumé | 50 cc |
| Aqueous solution | 200 cc |

Heating as in Example 6 gave a powdery resin.

EXAMPLE 55

| The Production of a Silicon Powder | |
|---|---|
| Phenol | 300 cc |
| Sodium silicate 20° Baumé | 40 cc |
| Hydrochloric acid (35%) | 10 cc |
| Aqueous solution | 200 cc |

Heating as in Example 6 gave a powdery resinous product.

EXAMPLE 56

| The Production of a Silicon Powder | |
|---|---|
| Monochlorobenzene | 300 cc |
| Sodium silicate 20° Baumé | 300 cc |
| Hydrochloric acid (35%) | 20 cc |
| Aqueous solution | 200 cc |

Heating as in Example 6 gave a powdery resinous material.

EXAMPLE 57

| The Production of a Silicon Powder | |
|---|---|
| Aminoacetic acid | 300 cc |
| Sodium silicate 20° Baumé | 50 cc |
| Glacial acetic acid | 50 cc |
| Ammonia water (28%) | 30 cc |
| Aqueous solution | 200 cc |

Heating as in Example 6 gave a powdery resinous material.

EXAMPLE 58

| The Production of a Silicon Powder | |
|---|---|
| D-glucose 7° Baumé | 400 cc |
| Sodium silicate 20° Baumé | 40 cc |
| Glacial acetic acid | 50 cc |
| Aqueous solution | 200 cc |

The solution of D-glucose used was the same one as appeared in Example 45. Heating the above mixture as in Example 6 gave a viscous powdery resin.

EXAMPLE 59

| The Production of a Silicon Oil | |
|---|---|
| D-glucose 7° Baumé | 400 cc |
| Sodium silicate 20° Baumé | 40 cc |
| Acetanilide $C_6H_5NHCOCH_3$ | 50 g |
| Aqueous solution | 200 cc |

The solution of D-glucose used was the same one as appeared in Example 45. Heating was performed as in Example 6. The product obtained was an oily resinous material which, when allowed to stand at room temperature, soon solidified.

EXAMPLE 60

| The Production of a Silicon Oil | |
|---|---|
| Black liquor 10° Baumé, pH 9 | 300 cc |
| Trichloromethylsilane $CH_3SiCl_3$ | 25 cc |
| Sodium hydroxide | 20 g |
| Aqueous solution | 150 cc |

If trichloromethylsilane is diluted directly with an aqueous solution an account of strong acidity, a gelatinous precipitated is formed.

A solution of an alkali metal is preferably used to dilute trichloromethylsilane and a thorough mixture thus formed is added under agitation to the black liquor with success.

25 cc of trichloromethylsilane was added to 150 cc of aqueous solution in which sodium hydroxide was dissolved.

The mixture was added to the black liquor stirred to a thorough mixture and then heated as in Example 6 and a viscous matter was produced.

EXAMPLE 61

| The Production of a Silicon Oil | |
|---|---|
| Methyl alcohol | 300 cc |
| Dichlorodimethylsilane $(CH_3)_2SiCl_2$ | 25 cc |
| Aqueous solution | 200 cc |

Dichlorodimethylsilane can be directly added to alcohol for polymerization.

To methyl alcohol, dichlorodimethylsilane and then an aqueous solution were added.

The resulting mixture was heated as in Example 6, to produce an oily matter.

Volatile acids, such as, hydrochloric, formic and acetic acids are vaporized during the high temperature reaction. Those acids which remain unchanged and included in the product should be removed by washing with a hydroxyl group free solvent, such as, acetone. If the polymer obtained contains terminal hydroxyl groups, they are best removed with carboxylic acid or isocyanate, depending on the purpose. This procedure is necessary for obtaining a highly heat resistant and insulating resin.

Unlike previously proposed processes for producing organic silicon resins, the process of this invention forms silicic acid, as mentioned in the foregoing descriptions, by adding inexpensive and readily available silicon compounds, such as, silicon dioxide and ammonia water or silicates to an alkali black liquor or other organic compounds which contain hydroxyl groups.

The reaction mixtures as appeared above are heated to effect dehydration and also for removing any unreacted substances by vaporization, to complete the condensation polymerization. Thus, this invention provides a novel process for manufacturing organic silicon resins of various properties, ranging from oily greasy to solid.

This invention is also particularly noteworthy in that it has succeeded in fully utilizing the black liquor produced in the digesting process in the pulp industry which hitherto was recognized as a major source of environmental pollution.

What is claimed is:

1. A method for producing organosilicon oils and resins from alkali pulp black liquors obtained from rice straws comprising
   (a) concentrating the black liquor;
   (b) adding acid to the condensed black liquor to adjust the pH to the range from about 8 to 10 to convert silicates therein to silicic acid which precipitate but to avoid precipitation of any alkali lignin salt and separating the liquor from the precipitate,
   (c) adding an aqueous solution of ammonia to the separated liquor from step (b) and heating said admixture to effect condensation polymerization under conditions sufficiently alkaline to avoid the precipitation of any alkali lignin salt and to produce an organosilicon.

2. A method for producing organosilicon oils and resins from alkali pulp black liquors, comprising adjusting the pH of the black liquor to a value from about 8 to 10, adding a silicon containing compound selected from the group consisting of silicates and organosilicon compounds having the formula $$R_xSiX_{4-x}$$

wherein

R is a monovalent organic group;
X is a hydroxyl group, resulting from hydrolysis or not; and
x is 0 to 3; to the black liquor in an approximately stoichiometrically equivalent amount to the hydroxyl compounds in said black liquor, heating said mixture to convert the silicon containing compounds to silicic acid but in a manner so as not to precipitate any alkali lignin salts and then continuing to heat the mixture to effect polymerization of the hydroxyl compounds and the silicon containing compounds.

3. A method for producing organosilicon resins from alkali pulp black liquors produced from pulp digestion of rice straws using the soda or lime processes in which an alkali pulp black liquor containing polyfunctional organic compounds having hydroxyl grups and water soluble or insoluble silicates is first treated with an acid or ammonia water to adust the pH to 8 to 11 and the pH adjusted material is concentrated and heated to convert the silicates therein to silicic acid in such a way as to avoid precipitation of alkali lignin salts, and the entire mixture is then reacted by heating for a period and at a temperature sufficient to cause polymerization of the compounds having hydroxyl grups and to remove any unrected substances by vaporization, leaving the organosilicon resins.

* * * * *